United States Patent [19]

Springer

[11] Patent Number: 4,458,709

[45] Date of Patent: Jul. 10, 1984

[54] METHOD AND APPARATUS FOR MEASURING AND CONTROLLING FLUID FLOW RATES

[75] Inventor: Carl M. Springer, Park Ridge, Ill.

[73] Assignee: Binks Manufacturing Company, Franklin Park, Ill.

[21] Appl. No.: 134,491

[22] Filed: Mar. 27, 1980

[51] Int. Cl.³ ............................................. G05D 11/13
[52] U.S. Cl. ........................................ 137/10; 137/98; 137/486; 137/487.5; 73/204; 73/861.05
[58] Field of Search ................. 137/3, 10, 98, 101.19, 137/487.5; 73/194 E, 204, 486, 861.05

[56] References Cited

U.S. PATENT DOCUMENTS 3,757,808  9/1973  Peterson et al. ................. 137/487.5
4,228,815 10/1980  Juffa et al. ............................ 137/98

*Primary Examiner*—Martin P. Schwadron
*Attorney, Agent, or Firm*—Gary, Juettner & Pyle

[57] ABSTRACT

To measure the flow rate of a fluid in a pipe, a heat pulse is injected into the fluid by a heat pulse generator, and the time of flight of the pulse between the generator and a sensor is measured. Arrival of the pulse at the sensor is determined by detecting a selected temperature level of the ascending flank of the pulse, and a predetermined temperature level of the descending flank is then detected to initiate generation of the next subsequent pulse. Since the temperature of the descending flank generally represents the temperature of the fluid between the heat pulse generator and sensor, the technique ensures that the accuracy of each successive flow rate measurement is not affected by residual heat from the preceding measurement, and yet enables measurements to be obtained at maximum frequencies. In one embodiment the measurements are used to control the flow rate of the measured fluid, and in another the flow rate of fluid in one or more additional pipes.

40 Claims, 5 Drawing Figures

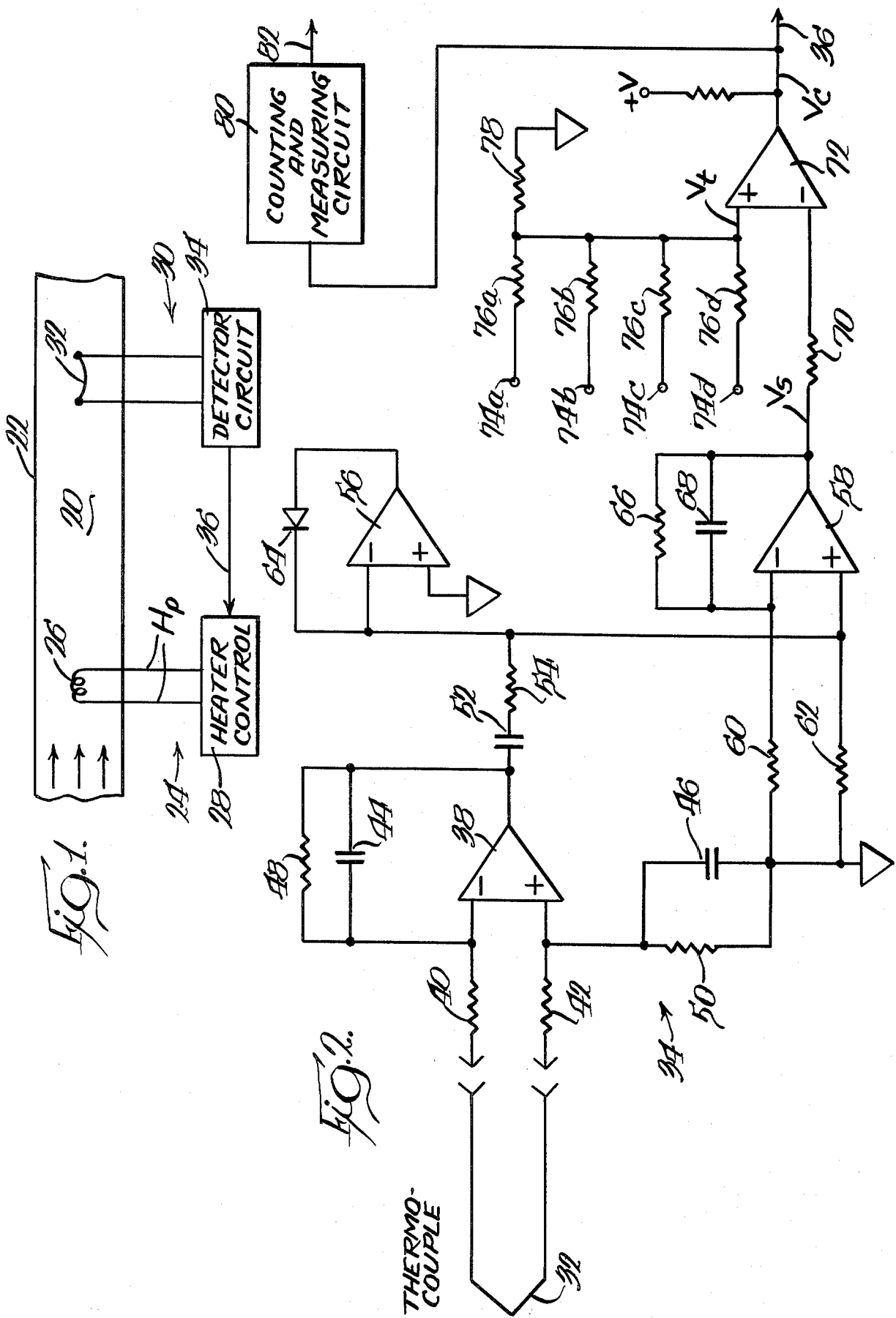

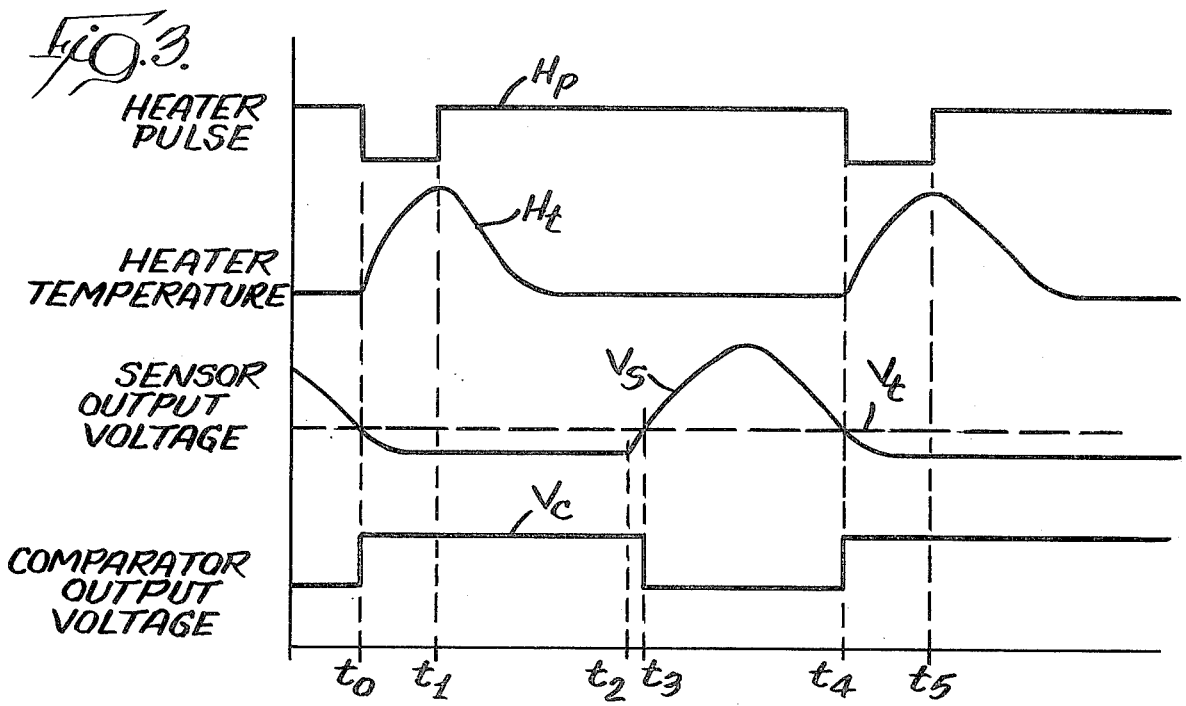
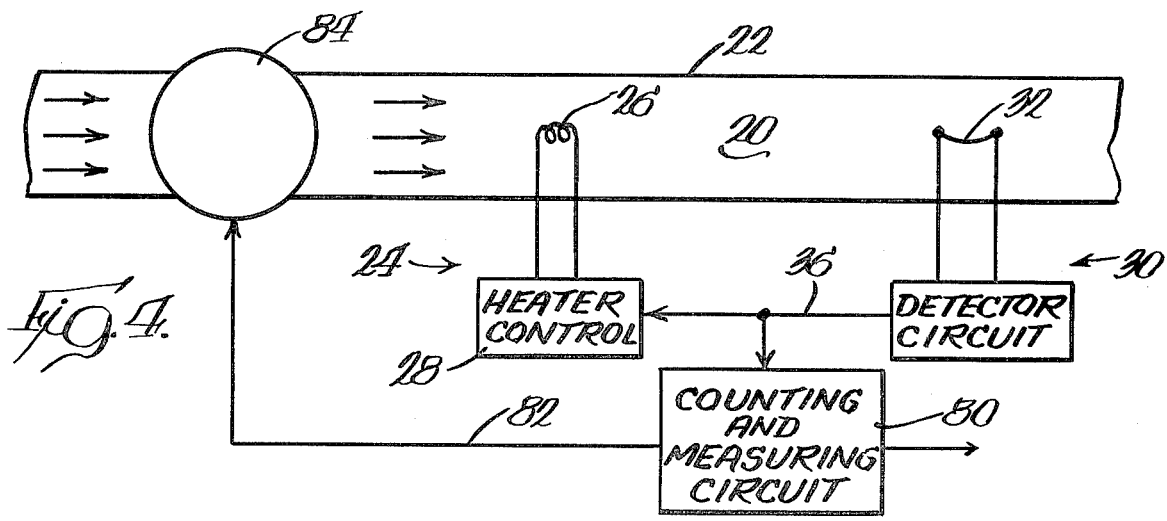
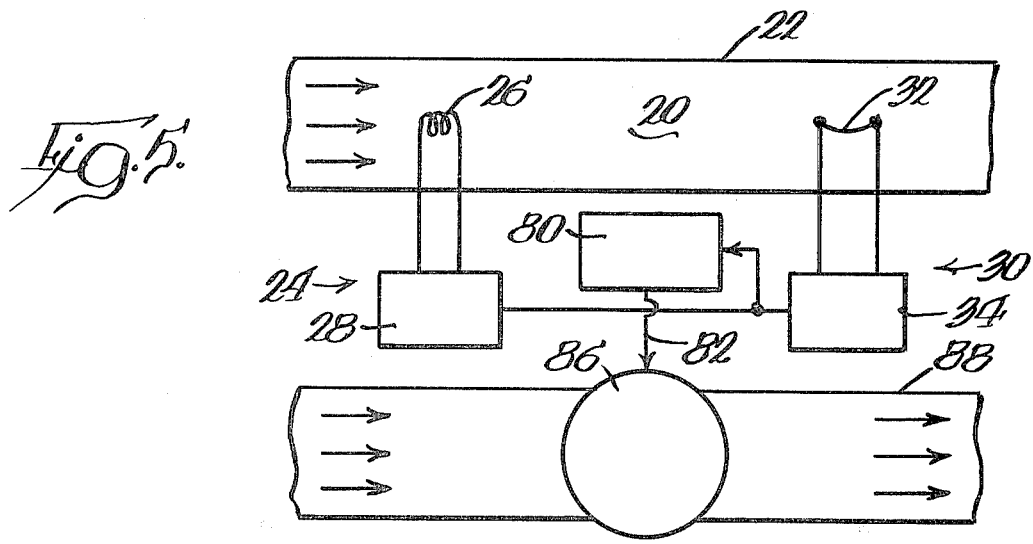

METHOD AND APPARATUS FOR MEASURING AND CONTROLLING FLUID FLOW RATES

BACKGROUND OF THE INVENTION

The present invention relates to methods and apparatus for measuring and controlling fluid flow rates, and in particular to an improved method and apparatus in which both the ascending and descending flanks of a heat pulse, injected into a fluid flow, are detected to control and regulate the frequency of the measuring functions.

Various systems are available for measuring fluid flow rates. One such system, for example, uses a vane positionable in and rotatable by a fluid flow. The rate of rotation of the vane is measured, and represents the flow rate of the fluid. However, because such systems are substantially mechanical in nature, they are subject to failure and tend to be inaccurate over a wide range of fluid flow rates.

To overcome the disadvantages of mechanical flow rate measuring devices, in another type of system a heat pulse generator introduces heat pulses into a fluid flow, and the pulses are detected by a sensor positioned downstream from the generator. The time of flight of the pulse between the generator and sensor is determined by detecting either the ascending or descending flank of the pulse, and represents the flow rate of the fluid. Although such systems are not readily subject to mechanical failure, a sufficient time interval must exist between successive heat pulses in order to ensure that the system has cooled down from a preceding heat pulse before a subsequent pulse is generated. Consequently, flow rate measurements are often subject to inaccuracies, either because the intervals between successive heat pulses are not sufficiently long to ensure system cool down, or because the intervals are overly long so that measurements are obtained less frequently than would otherwise be possible.

Among the various uses for fluid flow rate measuring systems are those in liquid two component systems, for example two component lacquer spray paint systems, which in recent years have gained increasing importance, particularly in the automobile industry. The reason for the popularity of two component lacquer systems lies in the superior qualities of the resulting coatings obtained, which quality can only be maintained if the components are metered with great accuracy. Lacquer spraying techniques used in most mass production processes require continuous, component flow rate measuring and dosing, and once adjusted the dosing rate for the system in question must always remain constant, since fluctuations can lead to serious loss of quality. Flow rate measuring systems for two component dosing apparatus known and used heretofore in spray paint systems do not meet these requirements.

OBJECTS OF THE INVENTION

An object of the present invention is to provide improved methods and apparatus for measuring fluid flow rates.

Another object of the invention is to provide such methods and apparatus, wherein a measured flow rate is used to maintain the flow rate at a selected value.

A further object of the invention is to provide such methods and apparatus, wherein the measured flow rate of a first fluid is used to control the flow rates of one or more other fluids, whereby selected fluid flow rate ratios may be obtained.

Yet another object of the invention is to provide such methods and apparatus, wherein the transit time of a heat pulse between a heat pulse generator and a sensor positioned in a fluid flow is measured to obtain fluid flow rates, and wherein each subsequent heat pulse is generated only in response to detecting passage of the preceding heat pulse past the sensor, whereby very accurate flow rate measurements are obtained at maximum frequencies.

SUMMARY OF THE INVENTION

In accordance with the present invention, a system for measuring the flow rate of a fluid comprises means for injecting a thermopulse into a fluid flow at a first point therein, and thermopulse detecting means positionable at a second point in the fluid flow, wherein said second point is a known distance downstream from said first point. Also included are means for measuring the time interval between injection of the thermopulse into the fluid flow and detection of a leading flank thereof by said detecting means, wherein said time interval is representative of the fluid flow rate, and means coupled between said thermopulse detecting means and said means for injecting for operating said means for injecting to inject a subsequent thermopulse into the fluid flow upon detection of a lagging flank of the preceding thermopulse.

Preferably, said thermopulse detecting means detects the leading and lagging flanks of the thermopulse by detecting a selected temperature level of the leading and lagging flanks, and in one embodiment said system also includes means for controlling the fluid flow rate, and means for coupling said fluid flow rate controlling means with said measuring means for operating said fluid flow rate controlling means to maintain a selected flow rate. In another embodiment said system includes means for controlling the flow rate of another fluid, and means for coupling said fluid flow rate controlling means with said measuring means for operating said fluid rate controlling means to maintain selected fluid flow rate ratios.

In accordance with the method of the invention, measuring the flow rate of a fluid comprises the steps of injecting a thermopulse into the fluid flow at a first point therein, and detecting arrival of a leading flank of the thermopulse at a second point in the fluid flow, wherein the second point is a known distance downstream from the first point. Also included are the steps of measuring the transit time of the thermopulse between the first and second points, said transit time being representative of the fluid flow rate, detecting a lagging flank of the thermopulse at the second point and, upon detecting the lagging flank, injecting a subsequent thermopulse into the fluid flow at the first point.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a highly simplified schematic representation of a system for measuring the flow rate of a fluid by generating a heat pulse in the flow and measuring the time of flight of the pulse between the generator and a sensor;

FIG. 2 is a schematic representation of a circuit for receiving the output from the sensor of FIG. 1, for generating an indication of fluid flow rate, and for controlling operation of the heat pulse generator in response thereto;

FIG. 3 is a graphical representation of certain features of operation of the system and circuit shown in FIGS. 1 and 2;

FIG. 4 is a schematic representation of an embodiment of the invention in which the flow rate of a fluid is both measured and controlled, and FIG. 5 is a schematic representation of another embodiment of the invention in which the measured flow rate of a first fluid is used to control the flow rate of a second fluid.

DETAILED DESCRIPTION

Referring to the drawings, there is shown in FIG. 1 a schematic representation of a system for detecting the flow rate of a fluid 20 in a pipe 22. The system includes a heat pulse generator, indicated generally at 24, which comprises a heating or resistance element 26 positioned in the fluid flow and a control unit 28 for applying a voltage pulse across the element to heat the same and inject a heat pulse into the fluid. The system also includes heat pulse detector means, indicated generally at 30, which comprises a sensor or thermocouple 32 positioned in the fluid flow downstream from the heating element and a detector circuit 34 for receiving the output from the sensor. In operation of the system, the heating element 26 is briefly energized to generate a heat pulse in the fluid flow, and the time of flight or transit time of the heat pulse between the heating element and the sensor 32 is measured by detecting the arrival of the pulse at the sensor. The heating element and the sensor are spaced a known distance apart, whereby the time of flight represents the flow rate of the fluid.

To the extent described, the system of FIG. 1 is generally conventional and would suffer the disadvantages of such systems. That is, with conventional flow rate systems of the general type, a problem arises in determining the rate of energization of the heating element 26, which in turn determines the rate at which flow rate measurements are obtained. Obviously, the system cannot continuously monitor the flow rate of a fluid, but instead provides discrete measurements at the rate of energization of the heating element. Should the heating element be energized only infrequently, then inaccuracies arise as a result of the extended intervals during which no measurements are obtained, during which time the fluid flow rate may vary appreciably. On the other hand, should the heating element be energized too frequently, then there will be insufficient time for system cool down between successive heat pulses, with the result that accurate detection of each succeeding heat pulse will be impaired by residual heat in the fluid from the preceding pulse. Although attempts have been made in prior systems to overcome the latter problem by initiating generation of each heat pulse simultaneously with detection by the sensor of the preceding pulse, the technique nevertheless does not ensure sufficient system cool down between successive pulses for accurate measurements to be obtained.

In overcoming the disadvantages of prior systems, in accordance with the teachings of the present invention the sensing means 30 senses the arrival of a heat pulse at the sensor 32 by detecting a selected temperature level of an ascending flank of the pulse, and is coupled with the control unit 28 over a control path 36 for operating the same to initiate generation of a subsequent heat pulse only upon the sensor 32 thereafter detecting a predetermined temperature level of a descending flank of the pulse. The descending flank of the heat pulse represents the temperature of the fluid between the heating element and sensor, so that the particular technique ensures that successive heat pulses are not generated either prior to or after, but instead immediately upon, sufficient fluid cool down to ensure the accuracy of measurements. In consequence, very accurate flow rate measurements are obtained at maximum frequencies.

FIG. 2 illustrates a preferred embodiment of detector circuit 34. The circuit includes an operational amplifier (op amp) 38 connected at its inverting and noninverting inputs across the thermocouple through a pair of resistors 40 and 42. Together with a pair of capacitors 44 and 46 and a pair of resistors 48 and 50, the op amp 38 forms a differential amplifier and band pass circuit to filter out spurious signals from the sensor, and provides at its output only those signals which lie in a selected frequency range, for example in the 0.3–30 Hz range.

The output from the op amp 38 is applied through a capacitor 52 and a resistor 54 both to an inverting input to an op amp 56 and to a noninverting input to an op amp 58, the inverting and noninverting inputs to the op amp 58 also being connected with circuit ground through respective resistors 60 and 62. The noninverting input to the op amp 56 is connected to circuit ground, and together with a diode 64 coupled between the output from and the inverting input to the op amp, the op amp defines a zero restoring circuit which maintains a reference level about which the signal from the op amp 38 may vary to one side, with the diode 64 clipping off signal values to the other side of the reference level.

A resistor 66 and a capacitor 68 are in parallel between an output from the op amp 58 and the inverting input thereto, so that the op amp amplifies the signal received from the op amp 38. Thus, the output from the op amp 58 is an amplified representation of the band pass filtered and zero restored signal from the sensor 32.

The output from the op amp 58 is applied through a resistor 70 to an inverting input to an op amp 72, the noninverting input to which is coupled with a plurality of control voltage input terminals 72a–d through associated resistors 76a–d, as well as with circuit ground through a resistor 78. The resistors 76a–d have distinct values, and in operation of the circuit a control voltage is applied to a selected one of the terminals 74a–d. Thus, the op amp 72 operates as a comparator for comparing the output voltage from the op amp 58 with the voltage at the juncture of the voltage divider formed by the resistor 78 and the resistor 76a–d associated with the terminal 74a–d to which the control voltage is applied. The output from the op amp 72 is coupled over the control path 36 with the control unit 28 for controlling generation of heat pulses, as well as with an input to a counting and measuring circuit 80 which generates at an output 82 therefrom a signal representative of the flow rate of fluid in the pipe 22.

Considering the particular mode of operation of the detector circuit 34, and with reference also to FIG. 3, from a time $t_0$ to a time $t_1$ a voltage pulse $H_p$ is applied across the heating element 26 by the control unit 28, and results in a rise in the temperature $H_t$ of the heating element. This causes a heat pulse to be injected into the fluid flow 20 in the pipe 22, which is carried from the heating element to the sensor 32 at a speed in accordance with the flow rate of the fluid.

Upon the ascending or leading flank of the heat pulse reaching the sensor 32 at a time $t_2$, the sensor generates across the inputs to the op amp 38 a voltage signal having a value in accordance with the temperature of the heat pulse. The op amp 38 in turn applies an input to the op amp 58, which generates at its output a voltage signal $V_s$, which is an amplified representation of the band pass filtered and zero restored output voltage from the sensor. The voltage $V_s$ is coupled to the inverting input to the op amp 72, the noninverting input to which receives a threshold voltage $V_t$ having a value determined by the terminal 74a–d to which a control voltage is applied. In the absence of a heat pulse at the sensor, the threshold voltage $V_t$ is positive with respect to the voltage $V_s$, so that an output voltage $V_c$ from the comparator op amp 72 is at a logic level 1. However, upon occurrence of the ascending flank of a heat pulse at the sensor, the voltage $V_s$ increases until, at a time $t_3$, it exceeds the threshold voltage $V_t$, whereupon a negative transition occurs in the output voltage $V_c$ as it changes from a logic level 1 to a logic level 0. Thereafter, as the descending flank of the heat pulse moves past the sensor, the voltage $V_s$ decreases until, at a time $t_4$, it again becomes negative with respect to the threshold voltage $V_t$, whereupon a positive transition occurs in the voltage $V_c$ as it changes from a logic level 0 to a logic level 1. Since the voltage $V_s$ represents the sensor output voltage, and therefore the sensed temperature of the heat pulse in the fluid flow, the negative going transition of the voltage $V_c$ at the time $t_3$ represents occurrence of a selected temperature of the ascending flank of the heat pulse at the sensor, and the positive going transition at the time $t_4$ represents occurrence of the same selected temperature of the descending flank at the sensor, with the threshold voltage $V_t$ establishing an operational error margin for the circuit, for example to compensate for slight variations in the ambient or quiescent temperature of the fluid 20.

As will be described, each voltage pulse $H_p$ is applied to the heating element 26 in response to a positive going transition of the output voltage $V_c$, which occurs as the temperature of the lagging flank of the preceding heat pulse at the sensor 32 falls below a selected temperature, as determined by the value of the threshold voltage $V_t$. Consequently, the voltage $V_c$ is a positive logic level 1 from the time of generation of each heat pulse and until the selected temperature of the ascending flank of the pulse is detected by the sensor 32, and is a logic level 0 during passage of the pulse past the sensor and for as long as the sensed temperature of the pulse is at least equal to the selected temperature. Thus, the time for which the comparator voltage $V_c$ is a logic level 1, for example the time from $t_0$ to $t_3$, represents the transit time or the time of flight of a heat pulse between the heating element and the sensor, and therefore the flow rate of the fluid since the heating element and sensor are spaced a known distance apart. The comparator output voltage $V_c$ is applied as an input to the counting and measuring circuit 80, which generates at its output 82 a signal representative of the duration of each logic level 1 of the comparator voltage $V_c$, and therefore of the flow rate of the fluid 20. The counting and measuring circuit may comprise any conventional timing circuit for measuring the duration of each succeeding logic level 1 of the voltage $V_c$, and the output 82 is advantageously applied to a display for visually indicating the flow rate of the fluid.

As previously stated, the invention enables very accurate flow rate measurements to be obtained at maximum frequencies. This may be appreciated if it is considered that the descending flank of a heat pulse represents the fluid system temperature, or the temperature of the fluid between the heating element and the sensor. To obtain very accurate flow rate measurements, each succeeding heat pulse must be generated only after the fluid temperature has returned to a quiescent or ambient value following generation of a preceding heat pulse, so that heating of the fluid by the preceding pulse does not affect a subsequent measurement. At the same time, to obtain flow rate measurements at maximum frequencies, each successive heat pulse should be generated immediately upon, but not prior to, sufficient system cool down to ensure accurate flow rate measurements. To this end, in accordance with the present invention the comparator voltage signal $V_c$ is also carried via the control path 36 to the heating element control unit 28, which operates to apply a voltage pulse to the heating element upon each positive going transition of the voltage signal $V_c$, which occurs in response to a selected temperature of the descending flank of a heat pulse moving past the sensor 32. The selected temperature is determined by the value of the threshold voltage $V_t$, and is of a value to ensure that the fluid flowing between the heating element and sensor is substantially at an ambient or quiescent temperature and free of any thermal effects of the preceding heat pulse.

The circuit of the invention thus provides an improved means for measuring the flow rate of a fluid. By virtue of detecting a selected temperature level of the descending flank of a heat pulse prior to generation of a subsequent heat pulse, each flow rate measurement is unaffected by any heating effects of the preceding measurement and very accurate measurements are obtained. At the same time, since each succeeding heat pulse is generated immediately upon, not after, return of the fluid temperature to its quiescent value, no time is lost between successive measurements and the measurements are obtained at maximum frequencies. It is to be appreciated, of course, that the circuit is self-compensating in operation and independent of variations in the flow rate of the fluid, inasmuch as successive heat pulses are generated only in response to movement of the preceding heat pulse past the sensor, and not at a constant and predetermined rate.

The invention described thus far may be used solely for the purpose of obtaining accurate fluid flow rate measurements. However, the invention also contemplates, as shown in FIG. 4, both measuring and controlling the flow rate of a fluid. In this embodiment, the output 82 from the counting and measuring circuit 80 controls movement of the fluid 20 through the pipe 22, for example by controlling operation of a pump 84 for the fluid. The value of the signal at the output 82 represents the flow rate of the fluid, and the pump may include any suitable means for responding to the signal to operate the pump at a speed which maintains the signal at a constant, selected value, thereby to provide a selected and constant fluid flow rate. Obviously, a separate pump could move the fluid through the pipe, and the pump 84 replaced by a pressure regulator or other flow rate controller adapted to receive the signal at the output 82 and to control the flow rate in accordance with the value of the signal.

FIG. 5 illustrates another embodiment of the invention, in which the measured flow rate of fluid in the pipe 22 is used to control the flow rate of fluid in a separate pipe 88, for example by means of controlling operation of a pump 86 in line with the pipe 88. This embodiment would find use in a two component spray paint system, in which selected ratios of two components delivered to a spray paint station must be maintained.

While embodiments of the invention have been described in detail, various modifications and other embodiments thereof may be devised by one skilled in the art without departing from the spirit and scope of the invention, as defined in the appended claims.

What is claimed is:

1. A method of measuring the flow rate of a fluid, comprising the steps of injecting a thermopulse into the fluid flow at a first point therein; detecting arrival of a leading flank of the thermopulse at a second point in the fluid flow, wherein the second point is a known distance downstream from the first point; measuring the transit time of the thermopulse between the first and second points, the transit time being representative of the fluid flow rate; detecting a lagging flank of the thermopulse at the second point; and, upon detecting the lagging flank, injecting a subsequent thermopulse into the fluid flow at the first point.

2. A method as in claim 1, wherein said step of detecting arrival of the leading flank of the thermopulse comprises detecting a selected temperature level of the leading flank.

3. A method as in claim 1 or 2, wherein said step of detecting the lagging flank of the thermopulse comprises detecting a predetermined temperature level of the lagging flank.

4. A method as in claim 1, wherein said steps of detecting the leading and lagging flanks of the thermopulse comprise detecting a selected temperature level of the leading and lagging flanks.

5. A method as in claim 1, including the step of converting the measured transit time of the thermopulse into an indication of fluid flow rate.

6. A method as in claim 1, including the step of controlling the fluid flow rate in accordance with the measured transit time to maintain a selected flow rate.

7. A method as in claim 1, including the step of controlling the flow rate of another fluid in accordance with the measured transit time of the thermopulse in the one fluid, thereby to maintain selected ratios of fluid flow rates.

8. A method of measuring the flow rate of a fluid, comprising the steps of injecting a heat pulse into the fluid flow at a first point therein; detecting arrival of an ascending flank of the heat pulse at a second point in the fluid flow, wherein the second point is a known distance downstream from the first point; measuring the transit time of the heat pulse between the first and second points, the transit time being representative of the fluid flow rate; detecting a descending flank of the heat pulse at the second point; and, upon detecting the descending flank of the heat pulse, injecting a subsequent heat pulse into the fluid flow at the first point.

9. A method as in claim 8, wherein said step of detecting the descending flank of the heat pulse comprises detecting a selected temperature level of the descending flank.

10. A method as in claim 8 or 9, wherein said step of detecting arrival of the ascending flank of the heat pulse comprises detecting a predetermined temperature level of the ascending flank.

11. A method as in claim 8, including the step of converting the measured transit time of the heat pulse into an indication of fluid flow rate.

12. A method as in claim 8, including the step of controlling the fluid flow rate in accordance with the measured transit time to maintain a selected flow rate.

13. A method as in claim 8, including the step of controlling the flow rate of a second fluid in accordance with the measured transit time of the heat pulse in the one fluid, thereby to maintain selected fluid flow rate ratios.

14. A method of measuring the flow rate of a fluid, comprising the steps of positioning a heating element at a first point in the fluid flow; momentarily energizing the heating element to inject a heat pulse into the fluid flow; positioning a thermocouple at a second point in the fluid flow, wherein the second point is a known distance downstream from the first point and the thermocouple generates a signal having a value in accordance with the fluid temperature at the thermocouple; monitoring the thermocouple signal and generating a first control signal in response to a selected value of the thermocouple signal occurring upon arrival of an ascending flank of the heat pulse and a second control signal in response to a predetermined value of the thermocouple signal occurring upon arrival of a descending flank of the heat pulse; measuring the time interval from energization of the heating element until generation of the first control signal; and momentarily energizing said heating element to inject a subsequent heat pulse into the fluid in response to generation of the second control signal.

15. A method as in claim 14, wherein the selected and predetermined values of the thermocouple signal are equal.

16. A method as in claim 14, wherein said measuring step comprises measuring the time interval between occurrence of a second control signal generated in response to arrival of a descending flank of one heat pulse and a first control signal generated in response to arrival of an ascending flank of the next succeeding heat pulse.

17. A method as in claim 14, including the step of converting the measured time interval into an indication of fluid flow rate.

18. A method as in claim 14, wherein said monitoring step comprises generating an amplified representation of the thermocouple signal, comparing the amplified representation of the thermocouple signal with a threshold level, generating the first control signal upon the amplified representation of the thermocouple signal changing in value in a first direction past the threshold level, and generating the second control signal upon the amplified representation of the thermocouple signal changing in value in a second and opposite direction past the threshold level.

19. A method as in claim 14, including the step of controlling the fluid flow rate in accordance with the value of the measured time interval, thereby to maintain a selected flow rate.

20. A method as in claim 14, including the step of controlling the flow rate of another fluid in accordance with the measured time interval, thereby to maintain selected flow rate ratios of the fluids.

21. A system for measuring the flow rate of a fluid, comprising means for injecting a thermopulse into a fluid flow at a first point therein; thermopulse detecting means positionable at a second point in the fluid flow, wherein said second point is a known distance downstream from said first point; means for measuring the time interval between injection of the thermopulse into the fluid flow and detection of a leading flank thereof by said detecting means, wherein said time interval is representative of the fluid flow rate; and means coupled between said thermopulse detecting means and said means for injecting for operating said means for injecting to inject a subsequent thermopulse into the fluid flow upon detection of a lagging flank of the preceding thermopulse.

22. A system as in claim 21, wherein said thermopulse detecting means detects the lagging flank of the thermopulse by detecting a predetermined temperature level of the lagging flank.

23. A system as in claim 21 or 22, wherein said thermopulse detecting means detects arrival of the leading flank of the thermopulse by detecting a selected temperature level of the leading flank.

24. A system as in claim 21, wherein said thermopulse detecting means detects the leading and lagging flanks of the thermopulse by detecting a selected temperature level of the leading and lagging flanks.

25. A system as in claim 21, including means for converting said measured time interval into an indication of fluid flow rate.

26. A system as in claim 21, including means for controlling the fluid flow rate, and means for coupling said fluid flow rate controlling means with said measuring means for operating said fluid flow rate controlling means to maintain a selected flow rate.

27. A system as in claim 21, including means for controlling the flow rate of another fluid, and means for coupling said fluid flow rate controlling means with said measuring means for operating said fluid rate controlling means to maintain selected fluid flow rate ratios.

28. A system for measuring the flow rate of a fluid, comprising means for injecting a heat pulse into a fluid flow at a first point therein; heat pulse detecting means positionable at a second point in the fluid flow, the second point being a known distance downstream from the first point; means for measuring the time interval between injection of the heat pulse into the fluid flow and detection of an ascending flank thereof by said heat pulse detecting means, wherein the time interval is representative of the fluid flow rate; and means responsive to detection of a descending flank of the heat pulse by said detecting means for operating said means for injecting to inject a subsequent heat pulse into the fluid flow.

29. A system as in claim 28, wherein said means for detecting detects the descending flank of a heat pulse by detecting a selected temperature level of the descending flank.

30. A system as in claim 28 or 29, wherein said means for detecting detects arrival of the ascending flank of the heat pulse by detecting a predetermined temperature level of the ascending flank.

31. A system as in claim 28, including means coupled with said means for measuring for converting the measured time interval into an indication of fluid flow rate.

32. A system as in claim 28, including means for controlling the fluid flow rate, and means coupling said fluid flow rate controlling means with said measuring means for operating said fluid flow rate controlling means to maintain a selected flow rate.

33. A system as in claim 28, including means for controlling the flow rate of a second fluid, and means for coupling said flow rate controlling means with said means for measuring for operating said flow rate controlling means to maintain selected fluid flow rate ratios.

34. A system for measuring the flow rate of a fluid, comprising a heating element positionable at a first point in the fluid flow; means for momentarily energizing said heating element to inject a heat pulse into the fluid flow; a thermocouple positionable at a second point in the fluid flow, wherein the second point is a known distance downstream from the first point and said thermocouple generates a signal having a value in accordance with the fluid temperature thereat; means for monitoring the thermocouple signal and for generating a first control signal in response to a selected value of the thermocouple signal occurring upon arrival of an ascending flank of the heat pulse and a second control signal in response to a predetermined value of the thermocouple signal occurring upon arrival of a descending flank of the heat pulse; means for measuring the time interval from energization of said heating element until generation of said first control signal; and means responsive to generation of said second control signal for operating said energizing means to inject a subsequent heat pulse into the fluid flow.

35. A system as in claim 34, wherein the selected and predetermined values of the thermocouple signal are equal.

36. A system as in claim 34, wherein said measuring means measures the time interval between occurrence of a second control signal generated in response to arrival at said thermocouple of the descending flank of one heat pulse and a first control signal generated in response to arrival at said thermocouple of the ascending flank of the next succeeding heat pulse.

37. A system as in claim 34, including means coupled with said means for measuring for converting said measured time interval into an indication of fluid flow rate.

38. A system as in claim 34, wherein said monitoring means comprises means for generating an amplified representation of said thermocouple signal, and means for comparing said amplified representation of said thermocouple signal with a threshold level and for generating said first control signal upon said amplified representation of said thermocouple signal changing in value in a first direction past said threshold level and for generating said control signal upon said amplified representation of said thermocouple signal changing in value in a second and opposite direction past said threshold level.

39. A system as in claim 34, including means for controlling fluid flow rate, and means for coupling said fluid flow rate controlling means with said measuring means for operating said fluid rate controlling means to maintain a selected flow rate.

40. A system as in claim 34, including means for controlling the flow rate of another fluid, and means for coupling said fluid flow rate controlling means with said measuring means for operating said fluid flow rate controlling means to maintain selected flow rate ratios of the fluids.

* * * * *